Patented Mar. 4, 1947

2,416,738

UNITED STATES PATENT OFFICE 2,416,738

PROCESS FOR PREPARATION OF N-SUBSTITUTED AMIDES OF BETA-KETO-CARBOXYLIC ACIDS

Francis W. Cashion, Buffalo, N. Y., assignor to Allied Chemical & Dye Corporation, New York, N. Y., a corporation of New York No Drawing. Application July 4, 1944, Serial No. 543,486

7 Claims. (Cl. 260—562)

This invention relates to an improved process for the preparation of N-substituted amides, especially arylides, of beta-keto-carboxylic acids.

It was known heretofore to prepare arylides of beta-keto-carboxylic acids by reacting an ester of such acid, e. g., an ester of acetoacetic acid, with an aromatic amine. Such processes, however, are subject to the disadvantage that the amine tends to react not only with the carboxy ester group to form an amide, but also with the keto group of the beta-keto-carboxylic acid ester to form other types of condensation products. As a result, the reaction is generally neither smooth nor uniform, and is attended by side reactions leading to the formation of contaminating by-products, e. g., beta-arylamino-ethylcrotonates, beta-arylamino-crotonarylides, diaryl ureas and the like. Such side reactions reduce the yield of the beta-keto-carboxylic acid arylide and cause contamination of the product.

The beta-keto-carboxylic acid arylides are important as coupling components in the preparation of azo dyestuffs, especially in dyeing and printing processes involving formation of the dyestuffs on the fiber. For this purpose, it is essential that the arylides be completely soluble in dilute aqueous solutions of caustic alkali. The contaminating impurities, resulting from the aforesaid side reactions, include substances which are not soluble in dilute alkaline solutions, and which render the arylides unacceptable for dyeing, and especially for printing purposes.

In order to avoid or minimize the aforesaid difficulties, and to improve the yield of the beta-keto-carboxylic acid arylides, a number of modifications for improving the aforesaid reaction have been suggested. These include the use of an excess (in terms of chemical equivalents) of the beta-keto-carboxylic acid ester, or of the amine reacting therewith; the use of an inert solvent such as chlorobenzene or solvent naphtha; and the addition of an enolizing agent such as pyridine or a tertiary amine such as dimethylaniline. However, these expedients, while sometimes effective in the case of specific combinations of esters and aromatic amines, are not effective generally for improving the reaction, and sometimes increase side reactions, causing additional contamination and a decrease in yield of the desired beta-keto-carboxylic acid arylide.

The reaction of beta-keto-carboxylic acid esters with p,p'-diamino-diphenyls to form the corresponding bis-acylacetarylides is especially subject to these disadvantages. Even under apparently similar reaction conditions, the results as to yield and quality of the products vary widely. For example, in the preparation of bis-acetoacet-o-tolidide, by reaction of ethyl acetoacetate with o-tolidine in an inert solvent reaction medium, the yields vary, under the same reaction conditions, from less than 60% to as high as 80% of theory, and the product varies in quality from one which dissolves clearly to one which forms very turbid solutions in dilute aqueous alkalies. The presence of an inert organic solvent, and the addition of pyridine or dimethylaniline to the reaction mixture, do not improve the aforesaid results. The ultimate product is apparently contaminated with varying amounts of by-products, such as diarylureas, which are insoluble in dilute aqueous alkali, and which cannot be readily eliminated.

I have now discovered that the disadvantages of the aforesaid procedures can be eliminated by reacting an ester of a beta-keto-carboxylic acid with a member of the group consisting of aromatic and heterocyclic amines wherein an amino group containing at least one reactive hydrogen atom is attached directly to a carbon atom of the nucleus, in the presence of an aliphatic polyamine having the general formula

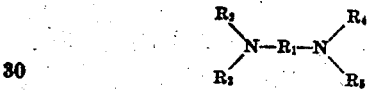

wherein $R_1$ represents a member of the group consisting of an aliphatic hydrocarbon chain and a chain of aliphatic hydrocarbon radicals interconnected by linkages selected from the group consisting of —NH—, —O—, and —S—; and $R_2$, $R_3$, $R_4$ and $R_5$, respectively represent members of the group consisting of hydrogen and an aliphatic hydrocarbon radical.

More specifically, the improved process comprises reacting a beta-keto-carboxylic acid ester with an aromatic or heterocylic amine wherein the amino group contains at least one reactive hydrogen atom, and preferably with an aromatic primary amine, in the presence of an aliphatic polyamine which is preferably an acyclic alkylene-polyamine, particularly an acyclic ethylene-polyamine. The terms "acyclic alkylene-polyamine" and "acyclic ethylene-polyamine" are used herein to denote alkylene-diamines or ethylene diamine and chain polymers thereof. Other aliphatic polyamines which can be employed include, for example, acyclic ethylene polyamino ethers and thio ethers, such as 2,2'-diamino-diethylether and 2,2'-diamino-diethylsulfide. The terms "aliphatic polyamine," "acyclic alkylene-polyamine" and "acyclic ethylene-polyamine," as employed herein and in the appended claims, include mixtures of such compounds as well as individual members thereof. For example, "acyclic ethylene-polyamine" denotes a compound or mixture of compounds having the general formula $NH_2C_2H_4(NH-C_2H_4)_nNH_2$, wherein $n$ is an integer including zero.

The process according to the invention is applicable generally for the preparation of N-substituted amides of beta-keto-carboxylic acids in which the N-substituent is an aromatic or heterocyclic radical, attached to the amido nitrogen by a nuclear carbon atom. It insures a smooth reaction, eliminates undesirable side reactions, and produces consistently high yields of products of a high quality, which are completely soluble in dilute aqueous caustic alkalis.

In carrying out the process according to a preferred embodiment of the invention, the beta-keto-carboxylic acid ester is heated, together with an aromatic or heterocyclic amine as hereinbefore defined, to a reaction temperature within the range 125° to 160° C., in the presence of an aliphatic polyamine of the class hereinbefore specified. The beta-keto-carboxylic acid ester together with the aliphatic polyamine is preferably mixed with an inert organic solvent capable of dissolving the ester and the aromatic or heterocyclic amine and preferably having a boiling point within the reaction temperature range. The mixture is heated to reaction temperature, and the aromatic or heterocyclic amine, either alone or in admixture with an inert organic solvent of the aforesaid type, is gradually added thereto. During the course of the reaction, the alcohol which is formed by reaction of the added amine with the beta-keto-carboxylic acid ester is preferably distilled off, together with part of the inert organic solvent. The reaction is complete when evolution of the alcohol ceases. The reaction mixture is then cooled to effect crystallization of the reaction product, and the latter may be recovered, for example, in the form of a filter cake, by filtration of the resulting crystal slurry. The product thus recovered can be washed with an organic liquid, for example, with a quantity of the inert organic solvent employed in the reaction mixture, and then dried; or it can be slurried with water, preferably acidified with a small amount of mineral acid, whereupon the resulting slurry can be boiled to remove any residual organic solvent by evaporation with steam, and the resulting aqueous suspension of N-substituted beta-keto-carboxylic acid amide can then be filtered to recover the product in the form of a filter cake, which is washed with hot water and dried.

The beta-keto-carboxylic acid esters employed according to the invention are preferably acylacetic acid esters, for example, benzoylacetates, furoylacetates, terephthaloyldiacetates, and especially acetoacetates. They are preferably esters of an alcohol which is volatile at temperatures below or within the reaction temperature range so as to facilitate removal of the alcohol by distillation during the reaction of the ester with the aromatic or heterocyclic amine. Thus, methyl or ethyl esters are preferred.

The aromatic and heterocyclic amines which are employed in the process of the invention contain at least one amino group which is attached directly to a carbon atom of the aromatic or heterocyclic nucleus and which contains at least one reactive hydrogen atom. Primary aromatic amines are preferred. The advantages of the invention are most strikingly realized in the case of p,p'-diamino-diphenyls, such as benzidine, or ortho-tolidine. Other primary aromatic amines which are suitable include aniline, homologues thereof, and its halogen, alkoxy, nitro, and acylamino derivatives (e. g. p-nitraniline, o-anisidine, and the like), and alpha and beta naphthylamine. Heterocyclic amines which can be employed in the process of the invention include, for example, amino-pyridines, amino-quinolines, amino-carbazoles, amino-dibenzofurans and 2-amino-thiazoles.

The proportions of beta-keto-carboxylic acid ester and aromatic or heterocyclic amine employed in the process of the invention are preferably such that the ester is present in an amount substantially in excess of one mol per equivalent of reactive amino groups in the aromatic or heterocyclic amine undergoing reaction. The use of an excess of the ester, amounting to about 20% to about 50% on the aforesaid molar basis, is preferred.

The aliphatic polyamines employed according to the invention are effective in surprisingly small amounts to secure advantages of the invention. For example, in reacting o-tolidine with ethyl acetoacetate, a quantity of triethylene-tetramine amounting to as little as 0.1% of the o-tolidine employed has been found to result in an improved yield and quality of arylide which, however, forms a hazy solution in dilute aqueous caustic solution; and quantities of triethylene tetramine between 0.5% and 20%, and of diethylene-triamine amounting to between 0.5% and 8% of the amount of o-tolidine employed, have been found effective to insure the production of disacetoacet-o-tolidide in yields amounting to 80% to 90% of theory, the product being completely soluble in dilute aqueous caustic solution. Considerably lower yields are obtained in the absence of an aliphatic polyamine. Preferably the quantity of assistant aliphatic polyamine employed is from 1% to 5% of the amount of the aromatic or heterocyclic amine undergoing reaction, since such amounts provide a wide margin of safety under different reaction conditions as well as for different reagents, while additional quantities of aliphatic polyamine are unnecessary to secure the advantages of the invention.

While the effect of the aliphatic polyamines, specified herein, upon the reaction of the invention is not fully understood, it is possible that the polyamines exert a specific enolizing effect upon the beta-keto-carboxylic acid esters, and in this way inhibit reaction of the aromatic or heterocyclic amines with the keto group of the ester, and possibly promote reaction of the reagent amines with the carboxylic ester group. The effect appears to be catalytic, involving no substantial reaction between the beta-keto-carboxylic acid ester and the aliphatic polyamine, since upon varying the proportions of the aliphatic polyamine over a wide range, no corresponding variation in the yield of the beta-keto-carboxylic acid amides has been observed.

The invention is illustrated by the following examples, wherein parts and percentages are by weight and temperatures are in degrees centigrade.

*Example 1*

A mixture of 156 parts of ethylacetoacetate, 330 parts of monochlorobenzene, and 7.5 parts of triethylenetetramine was agitated and heated to 125° to 130° in a reaction vessel provided with a fractionating column. 200 parts of a solution of 85 parts of orthotolidine in 440 parts of monochlorobenzene, previously heated to 80° to 100°, were added to the mixture in the reaction vessel, and the remainder was added in three approximately equal portions at intervals of about one-half hour after the first addition, while the temperature of the reaction mixture was gradually increased to 135°. 27 parts of alcohol, formed as a result of reaction of the ester with the amine, were distilled off together with 240 parts of monochlorobenzene, and were recovered as a condensate from the fractionating column. At the end of about two hours, evolution of alcohol ceased, indicating the reaction to be complete. The reaction mixture was cooled to room temperature to effect crystallization of the reaction product and the latter was separated from the mixture by filtration. The resulting filter cake was slurried with 1000 parts of water containing 10 parts of sulfuric acid and residual monochlorobenzene was eliminated by steam distillation. The resulting aqueous suspension of the reaction product was filtered, and the filter cake washed acid-free with hot water and dried at 80°. 140 parts of fluffy, light cream-colored, solid N,N'-bis(acetoacet)-o-tolidide were obtained, corresponding to 92% of the theoretical yield, based on the amount of o-tolidine employed. The product melted at 208° and was completely soluble in dilute (2½%) aqueous sodium hydroxide solution.

Upon carrying out the foregoing process under similar conditions, but in the absence of triethylenetetramine, or upon substituting therefor corresponding amounts of pyridine or dimethylaniline, the product obtained formed a turbid solution in dilute aqueous caustic soda, and the yields recovered were considerably less than were obtained according to the foregoing example.

*Example 2*

7.5 parts of diethylenetriamine were substituted for the triethylenetetramine in the process of Example 1. 134 parts of N.N'-bis(acetoacet)-o-tolidide, corresponding to 88% of the theoretical yield, were thereby obtained. The product melted at 204° and was completely soluble in dilute aqueous caustic soda solution.

*Example 3*

7.5 parts of ethylenediamine were substituted for the triethylenetetramine in the process of Example 1. 133 parts of N.N'-bis(acetoacet)-o-tolidide, corresponding to 88% of the theoretical yield, were thereby obtained. The product melted at 208° and formed a clear solution in dilute aqueous caustic soda solution.

*Example 4*

A mixture of 146 parts of ethylacetoacetate, 500 parts of monochlorobenzene and 7.5 parts of triethylenetetramine was heated to boiling temperature (130° to 135°) under reflux. 51 parts of finely divided para-nitraniline were added to the heated mixture. Additional quantities of finely divided para-nitraniline, amounting respectively to 26 parts, and two portions of 12 parts each, were added respectively at the end of 50 minutes, 85 minutes and 105 minutes after the initial introduction of para-nitraniline. During this period, and for about 30 minutes following introduction of the final quantity of para-nitraniline, the reaction temperature was slowly raised to 140°. Alcohol generated by the reaction was continuously distilled off, together with part of the monochlorobenzene. 30 parts of alcohol and 330 parts of monochlorobenzene were recovered as a distillate. The reaction mixture was then cooled to 10°, and the product, which separated in crystalline form, was recovered by filtration as a filter cake. The filter cake was washed successively with two portions of monochlorobenzene amounting to 55 parts each, and was then dried at 60°. 99 parts of pale yellow, crystalline p-nitro-acetoacetanilide were obtained, amounting to 60% of the theoretical yield. The product was completely soluble in dilute aqueous caustic soda solution.

Upon carrying out the process of this example in the absence of triethylenetetramine, 90 parts of a bright orange crystalline product were obtained, which was substantially insoluble in dilute aqueous caustic soda solution.

*Example 5*

A mixture of 146 parts of ethylacetoacetate, 242 parts of solvent naphtha and 7.5 parts of triethylene-tetramine was heated to boiling temperature (130 to 135°) in a reaction vessel provided with a fractionating column. 91.5 parts of o-anisidine were added to the mixture, at intervals, in four portions amounting respectively to 45.5 parts, 23 parts, and two portions of 11.5 parts each, the second, third and fourth portions being respectively added 15, 45 and 70 minutes after the initial addition of o-anisidine. During this period and during 45 minutes thereafter, the temperature of the reaction mixture was raised progressively from 130° to 160°. Alcohol, generated by the reaction, was distilled off together with part of the solvent naphtha, about 35 parts of alcohol and about 175 parts of solvent naphtha being recovered as a condensate from the fractionating column. The reaction mixture was then cooled to 10° and filtered. The filter cake was washed with two portions of solvent naphtha amounting to about 55 parts each, and then dried at 60°. 80 parts of white, crystalline aceto-acet-o-anisidide were obtained, corresponding to 52% of the theoretical yield. The product thus obtained was completely soluble in dilute aqueous caustic soda solution.

Upon carrying out the foregoing condensation under the same conditions, but in the absence of triethylenetetramine, 70 parts of a product were obtained which dissolved incompletely, forming appreciably turbid solutions, in dilute aqueous caustic soda solutions.

*Example 6*

A mixture of 146 parts of ethylacetoacetate, 330 parts of solvent naphtha and 7.5 parts of triethylenetetramine was heated to about 80° in a reaction vessel provided with a fractionating column. 69 parts of aniline were added at intervals in four portions amounting respectively to 33.7, 17.4, 8.4 and 9.5 parts, the latter three portions being added respectively at the end of 47, 85, and 113 minutes after addition of the first portion. After addition of the last portion, the mixture was heated for a period of 108 minutes. During the first 10 minutes, the reaction temperature was raised to 125°, and during 37 minutes thereafter (i. e. until addition of the second portion of aniline) the temperature was raised to 145°. The temperature was then held at about 145° for about 2 hours, and finally raised during the last hour to 157°. About 41 parts of alcohol and about 170 parts of solvent naphtha distilled off between 125° and 145.5° during the first 160 minutes, and about 150 parts of solvent naphtha distilled off between 145° and 157° during the final hour of the reaction period. The reaction mixture was then cooled to 5° and maintained at this temperature for one hour to induce crystallization of the reaction product. The latter was separated by filtration. The filter cake was washed with two portions (55 parts each) of solvent naphtha at 5°, and dried at 65°. 59 parts of white, crystalline acetoacetanilide were thus obtained. 3 parts of the product dissolved completely in 50 parts of a 2% aqueous caustic soda solution at 30° to form a clear, pale yellow solution.

Upon carrying out the process of this example in the absence of triethylenetetramine, 49 parts of an acetoacetanilide product were obtained, which dissolved in dilute aqueous caustic soda to form a turbid solution.

Variations and modifications within the scope of the invention may be made in the process illustrated in the foregoing examples; for example, corresponding amounts of other aliphatic polyamines, such as N,N'-trimethyl-ethylene-diamine, N-methyl-N'-ethyl-ethylene-diamine, N,N'-tetramethyl-ethylene-diamine, 2,2'-diamino-diethyl-ether, and 2,2'-diamino-diethyl-sulfide can be substituted for the acyclic ethylene-polyamines employed in the examples. Moreover, the reaction may be carried out in the absence of any inert solvent, the excess beta-keto-carboxylic acid ester serving in this case as a reaction medium.

I claim:

1. A process for producing an N-substituted amide of a beta-keto-carboxylic acid which comprises heating an ester of a beta-keto-carboxylic acid with an amine selected from the group consisting of aromatic and heterocyclic amines having an amino group containing at least one reactive hydrogen atom attached directly to a carbon atom of the nucleus, in the presence of an aliphatic polyamine having the general formula

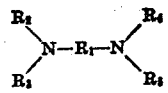

wherein R₁ represents a member of the group consisting of an aliphatic hydrocarbon chain and a chain of aliphatic hydrocarbon radicals interconnected by linkages selected from the group consisting of —NH—, —O—, and —S—, and R₂, R₃, R₄ and R₅ represent members of the group consisting of hydrogen and aliphatic hydrocarbon radicals, the amount of polyamine employed being not over 20% by weight of the aromatic or heterocyclic amine.

2. A process for producing an N-substituted amide of a beta-keto-carboxylic acid which comprises heating an ester of a beta-keto-carboxylic acid with an aromatic amine containing at least one reactive hydrogen atom in the amino group, in the presence of an acyclic alkylene polyamine, the amount of polyamine employed being not over 20% by weight of the amount of aromatic amine.

3. A process for producing an N-substituted amide of a beta-keto-carboxylic acid which comprises heating an ester of an acyl acetic acid with an aromatic primary amine in the presence of an acyclic ethylene polyamine, the amount of polyamine employed being not over 20% of the weight of aromatic amine.

4. A process for producing an N-substituted amide of a beta-keto-carboxylic acid which comprises heating, at a temperature between 125° and 160° C., an ester of a beta-keto-carboxylic acid with a p,p'-diamino-diphenyl in the presence of an acyclic ethylene polyamine, the amount of polyamine employed being between about 0.5% and about 20% by weight of the p,p'-diamino diphenyl.

5. A process for producing an N,N'-bis(acetoacet)-o-tolidide which comprises heating, at a temperature from 125° to 160° C., an acetoacetic acid ester of an alcohol which is volatile at the aforesaid temperature with o-tolidine in the presence of an acyclic ethylene polyamine, the amount of polyamine employed being between 0.5% and 20% by weight of the tolidine, and simultaneously removing said alcohol from the reaction mixture by distillation.

6. A process for producing an N,N'-bis-acetoacetyl-p,p'-diamino-diphenyl, which comprises heating, at a temperature from 125° to 160° C., an acetoacetic acid ester of an alcohol which is volatile at the aforesaid temperature, with a p,p'-diamino-diphenyl in the presence of an acyclic ethylene-polyamine in an amount from 1% to 5% of the quantity of p,p'-diamino-diphenyl employed.

7. A process for producing an N-substituted amide of a beta-keto-carboxylic acid, which comprises heating, at a temperature from 125° to 160° C., an ester of a beta-keto-carboxylic acid with an aromatic primary amine in the presence of an acyclic alklene polyamine in an amount from 1% to 5% of the quantity of aromatic amine employed.

FRANCIS W. CASHION.

REFERENCES CITED

The following references are of record in the file of this patent:

UNITED STATES PATENTS

| Number | Name | Date |
|---|---|---|
| 2,064,331 | Zwilgmeyer | Dec. 15, 1936 |
| 2,009,396 | Goldstein | July 30, 1935 |
| 2,092,797 | Carr | Sept. 14, 1937 |
| 2,312,082 | Dietrich | Feb. 23, 1943 |

FOREIGN PATENTS

| Number | Country | Date |
|---|---|---|
| 16,928 | British | 1912 |
| 211,772 | British | Feb. 28, 1924 |

Certificate of Correction

Patent No. 2,416,738.                                               March 4, 1947.

FRANCIS W. CASHION

It is hereby certified that errors appear in the printed specification of the above numbered patent requiring correction as follows: Column 4, line 37, for "disacetoacet" read *bisacetoacet*; column 8, line 16, claim 4, for "acycylic" read *acyclic*; line 44, claim 7, for "alklene" read *alkylene*; and that the said Letters Patent should be read with these corrections therein that the same may conform to the record of the case in the Patent Office.

Signed and sealed this 13th day of May, A. D. 1947.

[SEAL]

LESLIE FRAZER,
*First Assistant Commissioner of Patents.*